United States Patent Office 3,142,335
Patented July 28, 1964

3,142,335
ACIDIZING OF WELLS
Walter R. Dill and Francis N. Harris, Duncan, Okla., assignors to Halliburton Company, a corporation of Delaware
No Drawing. Filed July 5, 1960, Ser. No. 40,575
13 Claims. (Cl. 166—9)

This invention relates generally to the acidizing of wells and to other acidizing operations wherein iron and like substances are likely to be encountered. More particularly, the invention relates to a sequestering agent for iron and like substances, to an acidizing fluid containing such agent, and to treating methods using such fluid and agent.

In the oil industry, it is anticipated that the invention will be widely applied, for example, in connection with the acidizing of water disposal and injection wells wherein an encrustation of iron compounds or the like has become plated out or otherwise deposited, such as at the zone or formation into which water is injected during the course of operating the well.

In acidizing operations performed in the foregoing and other instances where deposits containing iron salts or oxides are contacted by the hydrochloric acid commonly employed as the acidizing fluid, it is not unusual to find that the treatment results only in a temporary increase in or restoration of the permeability of the structure to which the acid is applied. It is believed that, as the acid becomes spent, the iron salts and oxides which were caused or allowed to go into solution in the live acid, as iron chloride, tend to revert to iron hydroxide particles, which are insoluble in the spent acid. If a sequestering agent is not used, these iron hydroxide particles may become re-deposited or precipitated in a relatively short period of time, oftentimes in well operations being undesirably concentrated at locations relatively close to the bore of the well.

Where the well is a disposal or injection well, it is ordinarily desirable to displace the acidizing fluid with the fluid, such as water, which is subsequently injected into the well strata during the course of operating the well. If a sequestering agent is not included in the acidizing fluid used in treating these wells, there is increased likelihood that the iron hydroxide particles which become re-deposited or precipitated will be concentrated at locations near the bore of the well. In particular, if the re-deposition or precipitation is not delayed until adequate displacement of the acidizing fluid into the surrounding strata is accomplished, the iron hydroxide particles will tend to be concentrated, due to the relatively small radial area involved, at locations relatively near the face of the strata which the bore hole penetrates. These concentrated particles may objectionably plug, clog or otherwise obstruct the pore spaces and other openings providing fluid passageways in the well strata, thereby reducing the efficiency of the fluid injection system involved in operating the well as a disposal or injection well.

Where the well is a producing well, and in other instances where the spent acidizing fluid is to be removed from the well after the treatment, the re-deposition or precipitation of the iron hydroxide particles, if not sequestered, may undesirably occur prior to the removal of the spent fluid being accomplished. In these wells, too, the precipitated particles will tend to be objectionably concentrated near the face of the well strata, obstructing fluid passageways through which fluid is conducted during the course of producing the well.

Various sequestering agents for iron and like substances have heretofore been proposed. In acidizing operations performed on wells containing iron, it has been common practice to use acetic acid as a sequestering agent. While this practice has produced generally satisfactory results, especially in wells where the iron compounds are not too prevalent, the need for improvements has been recognized. In particular, there is need for a sequestering agent which is more effective in wells having high iron content. Also, there is need for an agent which is more effective in preventing the aforesaid instances of re-deposition or precipitation of iron deposits in concentrated amounts at locations near the face of the well strata.

One object of the present invention is to provide an improved sequestering agent especially suited for inclusion in or addition to an acidizing fluid used in treating wells containing iron and like substances.

Another and more general object of the invention is to provide an improved acidizing fluid and an improved method utilizing the same in acidizing operations.

A further and more specific object of the invention is to provide an improved, longer-acting sequestering agent for iron and like substances, an improved acidizing fluid containing the improved sequestering agent, and improved treating methods utilizing the improved acidizing fluid and sequestering agent, such as in acidizing operations performed in wells.

The foregoing and additional objects and advantages are attained, in accordance with the invention, by utilizing a sequestering agent containing a mixture of ingredients which, in combination, function as a buffering agent to control the pH of the acidizing fluid and retard its tendency to precipitate iron and like substances and also function to complex the ions of iron and the like to maintain the same in solution in the fluid for a longer period of time.

In one way of proceeding, a sequestering agent in accordance with the invention is prepared by combining citric acid or a salt thereof with a low molecular weight organic acid, such as acetic acid or formic acid, or a salt thereof. For example, in preparing an acidizing fluid containing hydrochloric acid, citric acid or a salt thereof in dry form and either the acetic acid or the formic acid, or one of the salts or a mixture thereof, is included in or combined with the hydrochloric acid solution.

If desired, various other agents and ingredients may be included in the acidizing fluid. For example, an agent may be included to improve the tendency of the acidizing fluid to penetrate zones or formations to which it is applied. Also an agent may be included to remove or reduce the likelihood of formation of emulsion and water blocks. Further, it may be desirable to include an acid inhibitor agent, such as to reduce or prevent the tendency of the acid to attack metal and like substances in the well conduit and other equipment past which the acidizing fluid is conducted during the course of treating the well.

Laboratory tests have been conducted to compare the iron sequestering ability of various agents. In preparing for these tests, samples of 15% hydrochloric acid solution containing the sequestering agent to be tested and varying concentrations of iron ($Fe^{+++}$) in solution were prepared and allowed to stand in contact with limestone in covered containers until precipitation occurred. The times required for precipitation of iron hydroxide ($FeOH_3$) from the various solutions were recorded.

In one series of tests, varying quantities of an 80% acetic acid solution were used alone as the sequestering agent, in accordance with prior art practices. In each instance the acetic acid solution was added on the basis of gallons per 1,000 gallons of the hydrochloric acid solution. The results of these tests are shown in Table I.

Table I

| Acetic Acid | Precipitation Time vs. Iron Concentration, Parts per Million Fe+++ in HCl Solution | | | | |
|---|---|---|---|---|---|
| | 2,000 | 4,000 | 6,000 | 8,000 | 10,000 |
| 15 gal | 22 hr | 11 hr | 2¾ hr | 40 min | 22 min |
| 20 gal | 24 hr | 24 hr | 12 hr | 6 hr | 2 hr |
| 30 gal | 72 hr | 72 hr | 49 hr | 46 hr | 30 hr |
| 40 gal | 120 hr | 96 hr | 96 hr | 96 hr | 76 hr |

In another series of tests, varying quantities of citric acid in dry or solid form were used alone as the sequestering agent. In each instance the citric acid was added on the basis of pounds per 1,000 gallons of the hydrochloric acid solution. The results of these tests are shown in Table II.

Table II

| Citric Acid | Precipitation Time vs. Iron Concentration, Parts per Million Fe+++ in HCl Solution | | | | | | |
|---|---|---|---|---|---|---|---|
| | 2,000 | 4,000 | 6,000 | 8,000 | 10,000 | 12,000 | 14,000 |
| 15 lb | 6 min | 6 min | 6 min | | | | |
| 20 lb | 6 min | 6 min | 6 min | | | | |
| 25 lb | 6 min | 6 min | 6 min | | | | |
| 30 lb | 6 min | 6 min | 6 min | | | | |
| 40 lb | 6 min | 6 min | 6 min | | | | |
| 67 lb | 1 wk.+ | 30 min | 30 min | 30 min | 30 min | 30 min | 30 min |
| 134 lb | 1 wk.+ | 1 wk.+ | 30 min | 30 min | 30 min | 30 min | 30 min |
| 167 lb | 1 wk.+ | 1 wk.+ | 1 wk.+ | 30 min | 30 min | 30 min | 30 min |
| 200 lb | 1 wk.+ | 1 wk.+ | 1 wk.+ | 30 min | 30 min | 30 min | 30 min |
| 267 lb | 1 wk.+ | 1 wk.+ | 1 wk.+ | 1 wk.+ | 30 min | 30 min | 30 min |
| 333 lb | 1 wk.+ | 1 wk.+ | 1 wk.+ | 1 wk.+ | 1 wk.+ | 30 min | 30 min |
| 400 lb | 1 wk.+ | 1 wk.+ | 1 wk.+ | 1 wk.+ | 1 wk.+ | 1 wk.+ | 30 min |
| 467 lb | 1 wk.+ | 1 wk.+ | 1 wk.+ | 1 wk.+ | 1 wk.+ | 1 wk.+ | 1 wk.+ |

In another series of tests, varying quantities of citric acid in dry or solid form and a given quantity of an 80% acetic acid solution were used to provide sequestering agents containing a mixture of ingredients in accordance with the invention. In each instance these ingredients were added to the acidizing fluid on the basis of 15 gallons of the acetic acid solution, with a varying number of pounds of the citric acid, per 1,000 gallons of the hydrochloric acid solution. The results of these tests are shown in Table III.

Table III

| Citric Acid | Precipitation Time vs. Iron Concentration, Parts per Million Fe+++ in HCl Solution | | | | | | |
|---|---|---|---|---|---|---|---|
| | 2,000 | 4,000 | 6,000 | 8,000 | 10,000 | 12,000 | 14,000 |
| 10 lb | | 96+ hr | 56+ hr | 8+ hr | 3+ hr | | |
| 15 lb | 1 wk.+ | 148 hr | | | | | |
| 20 lb | 1 wk.+ | 1 wk.+ | 140 hr | 60 hr | 20 hr | | |
| 25 lb | 1 wk.+ | 1 wk.+ | 1 wk.+ | 148 hr | 120 hr | | |
| 30 lb | 1 wk.+ | 1 wk.+ | 1 wk.+ | 1 wk.+ | 148 hr | 120 hr | |
| 40 lb | 1 wk.+ | 1 wk.+ | 1 wk.+ | 1 wk.+ | 1 wk.+ | 148 hr | 120 hr |

In another series of tests, varying quantities of calcium formate and citric acid were combined in dry or solid form to provide sequestering agents containing a mixture of ingredients also in accordance with the invention. In each instance these ingredients were added on the basis of pounds per 1,000 gallons of the hydrochloric acid solution. The results of these tests are shown in Table IV.

Table IV

| Mixture | Precipitation Time vs. Iron Concentration Parts per Million Fe+++ in HCl Solution | | | | | | |
|---|---|---|---|---|---|---|---|
| | 2,000 | 4,000 | 6,000 | 8,000 | 10,000 | 12,000 | 14,000 |
| 250 lb. Calcium Formate + 20 lb. Citric Acid | | 20 hr | 3 hr | | | | |
| 250 lb Calcium Formate + 40 lb. Citric Acid | 1 wk.+ | 1 wk.+ | 36 hr | 14 hr | 5 hr | | |
| 400 lb. Calcium Formate + 30 lb. Citric Acid | | 1 wk.+ | 100 hr | 24 hr | 14 hr | 6 hr | 2½ hr |

In yet another series of tests, the sequestering agent in each instance was 80% acetic acid solution and citric acid in dry or solid form, these ingredients being added to the hydrochloric acid solution in the ratio of 10 gallons of the acetic acid solution and 50 pounds of the citric acid per 1,000 gallons of the hydrochloric acid solution. The results of these tests are shown in Table V.

*Table V*

| Precipitation Time vs. Iron Concentration, Parts per Million $Fe^{+++}$ in HCl Solution ||||||||
| --- | --- | --- | --- | --- | --- | --- | --- |
| 2,000 | 4,000 | 6,000 | 8,000 | 10,000 | 12,000 | 14,000 | 16,000 |
| ------ | ------ | ------ | 1 wk. +--- | 72 hr.--- | 30 hr.--- | 12 hr.--- | 3 hr. |

Upon the basis of the foregoing tests, it is recommended that the mixture of acetic acid and citric acid be used where the acidizing fluid is employed in wells having relatively high iron content. It will be noted that somewhat better results were obtained using these ingredients (see Tables III and V) than were obtained using the calcium formate and citric acid mixture (see Table IV) in tests where high iron concentrations were present in the hydrochloric acid solution. However, even the calcium formate and citric acid mixture gave considerably better results than were obtained using the prior art acetic acid agent alone (see Table I).

Of particular interest, however, is a comparison of the results obtained in the tests shown in Tables I and II, not involving the mixtures of the present invention, with the results obtained in the tests shown in Tables III, IV and V, which do involve mixtures in accordance with the invention.

For example, it will be noted in Table I that the use of 15 gallons of the 80% acetic acid solution alone as the sequestering agent resulted in a precipitation time of 22 hours where the iron concentration in the hydrochloric acid solution (acidizing fluid) was only 2,000 parts per million and resulted in a precipitation time of only 22 minutes where the iron concentration was 10,000 parts per million. On the other hand, it is shown in Table III that the inclusion of from 10 to 40 pounds of citric acid with the same quantity of acetic acid solution resulted in a precipitation time of at least 96 hours and, in many instances, of more than 1 week, where the iron concentration was 4,000 parts per million or less. Similar improvements were obtained for higher iron concentrations, with the results being generally better for greater amounts of citric acid. However, it will be noted in Table III that even 10 pounds of citric acid, when used in combination with the acetic acid solution, was sufficient to provide a precipitation time in excess of 3 hours in a fluid having an iron concentration of 10,000 parts per million, as compared with a precipitation time in Table I of only 22 minutes in a similar fluid where the acetic acid solution alone was used as the sequestering agent.

It will be noted in Table II that the use of citric acid alone as the sequestering agent is either quite effective or very ineffective, depending on the relative concentration of the iron and the citric acid in the acidizing fluid. In particular, the citric acid concentration should be at least four times as great as the iron concentration to provide effective sequestering action. This means that the use of citric acid alone provides effective results only where relatively large amounts of the citric acid are present in relation to the iron concentration.

On the other hand, by using a relatively small amount of citric acid in combination with a relatively small amount of acetic acid solution, it was possible to obtain results which are greatly improved over the results obtained using either of these ingredients alone in the same amount or even in considerably larger amounts, particularly where the tests were made on fluids having relatively high concentrations of iron.

For example, the use of 333 pounds of citric acid alone (see Table II) was necessary to obtain a precipitation time in excess of 1 week where the iron concentration was 10,000 parts per million. This result was not obtained at all using 15 to 40 gallons of acetic acid solution alone (see Table I). On the other hand, in accordance with the invention, it was possible to obtain this result using only 40 pounds of citric acid in combination with only 15 gallons of acetic acid solution (see Table III).

By way of further emphasis, it is pointed out that the use of 40 pounds of citric acid alone as the sequestering agent (see Table II) resulted in a precipitation time of only 6 minutes where the iron concentration was up to 6,000 parts per million. Due to the poor results, it was felt unnecessary to make similar tests on fluids having even heavier iron concentrations.

Also, it is emphasized that the use of 15 gallons of acetic acid solution alone as the sequestering agent (see Table I) resulted in a precipitation time of only 22 minutes where the iron concentration was as high as 10,000 parts per million and this time was extended to only 2¾ hours where the iron concentration was reduced to 6,000 parts per million.

Accordingly, while the use of 40 pounds of citric acid in combination with 15 gallons of acetic acid solution resulted in a precipitation time in excess of 1 week, the use of either of these ingredients alone in the amount stated resulted in a precipitation time on the order of minutes, where the iron concentrations were relatively high. While the invention is not limited to any particular theory of behavior, it is believed that the superior results are due to a synergistic effect which is obtained where the mixture of ingredients is employed.

In carrying out a well operation, following the teachings of the present invention, any of various standard procedures and devices may be used for preparing and introducing the ingredients into the well. If desired, the acid solutions taken to the well site may be concentrated solutions, with dilution thereof occurring prior to or during the mixing of the various ingredients together.

While the order of mixing is not believed critical, a suggested procedure is to first add the ingredients of the sequestering agent to a quantity of water measured as the amount necessary to dilute the concentrated treating acid. Then the treating acid, such as concentrated hydrochloric acid, may be added and the ingredients may be agitated to provide a uniform mixture. If desired, an air mixture or other suitable agitation device may be employed. Also, a proportioning and mixing device may be used, if desired, in combining and blending the various ingredients together. Where agents in addition to the sequestering agent are to be included, these may be added at any convenient times in accordance with standard practices.

It will be appreciated by those skilled in the art that the particular mixture of ingredients necessary to obtain best results in a given operation will depend upon several factors. Among the items to be considered are the relative costs of the ingredients, the type of operation involved, and the amount of iron deposits likely to be encountered in the well itself or on the surfaces of equipment in the well.

In general, it is believed that satisfactory results will be obtained in most water disposal and injection wells using the mixture of Table V, which is 10 gallons of acetic acid solution and 50 pounds of citric acid per 1,000 gallons of hydrochloric acid solution used in treating the well. Where necessary or desired, additional acetic acid and/or citric acid may be included. Also, depending somewhat on cost, it may be preferred in certain instances to use less citric acid, such as in one of the mixtures of Tables III and IV.

While the maximum and minimum amounts are not considered critical, it is believed that at least 10 pounds of citric acid and 10 gallons of the acetic acid solution will be needed per 1,000 gallons of the treating acid solution, where this mixture is employed in a well acidizing operation. Where other mixtures are used, experience and tests will provide the best information as to the quantities required for best results in particular operations.

Thus, while the invention has been described herein with reference to certain embodiments and particulars thereof, it is understood that these are by way of example and not by way of limitation. The scope of the invention is best defined in the appended claims:

What is claimed is:

1. A sequestering agent for iron and like substances consisting essentially of a member from the group consisting of citric acid and the salts thereof and a member, other than citric acid and the salts thereof selected from the group consisting of the low molecular weight organic acids and the salts thereof, the relative proportions of said members being sufficient to prevent precipitation of iron and like substances, when a given amount of said sequestering agent is added to a hydrochloric acid acidizing fluid, for a longer period of time than is obtained when such given amount of either of said members alone is added to such acidizing fluid.

2. For use in the acidizing of wells and in other acidizing operations where iron and like substances are likely to be encountered, an hydrochloric acid acidizing fluid containing a sequestering agent as defined in claim 1, the total amount and relative proportions of said members being sufficient to prevent precipitation of said iron and like substances from said fluid for a longer period of time than is obtainable with an equal amount of either member alone.

3. In an acidizing operation, the step of applying to the structure to be treated an hydrochloric acid acidizing fluid containing a sequestering agent as defined in claim 1, the total amount and relative proportions of said members being sufficient to prevent precipitation of said iron and like substances from said fluid for a longer period of time than is obtainable with an equal amount of either member alone.

4. For use in wells, an hydrochloric acid acidizing fluid containing a sequestering agent for iron consisting essentially of citric acid and acetic acid, the total amount and relative proportions of said citric acid and acetic acid being sufficient to prevent precipitation of said iron from said fluid for a longer period of time than is obtainable with an equal amount of either acid alone.

5. An acidizing fluid as claimed in claim 4 wherein the citric acid is added in the ratio of at least 10 pounds per 1,000 gallons of the fluid and wherein the acetic acid is added in the ratio of at least 10 gallons per 1,000 gallons of the fluid, based on an 80% acetic acid solution.

6. An acidizing fluid as claimed in claim 4 wherein the citric acid is added in dry or solid form in the ratio of from about 10 to about 50 pounds per 1,000 gallons of the fluid and wherein the acetic acid is added in aqueous solution in the ratio of at least 10 gallons per 1,000 gallons of the fluid, based on an 80% solution of the acetic acid.

7. For use in wells, an hydrochloric acid acidizing fluid containing a sequestering agent for iron consisting essentially of a mixture of citric acid and a salt of formic acid, the total amount and relative proportions of said citric acid and said salt of formic acid being sufficient to prevent precipitation of said iron from said fluid for a longer period of time than is obtainable with an equal amount of either said acid or said salt alone.

8. An acidizing fluid as claimed in claim 7 wherein the salt of formic acid is calcium formate.

9. In a well acidizing operation, the step of introducing into the well an hydrochloric acid acidizing fluid containing a sequestering agent for iron consisting essentially of citric acid and acetic acid, the total amount and relative proportions of said citric acid and acetic acid being sufficient to prevent precipitation of said iron from said fluid for a longer period of time than is obtainable with an equal amount of either acid alone.

10. The invention as claimed in claim 9 wherein the citric acid is added in the ratio of at least 10 pounds per 1,000 gallons of the acidizing fluid and wherein the acetic acid is added in the ratio of at least 10 gallons per 1,000 gallons of the acidizing fluid, based on an 80% acetic acid solution.

11. The invention as claimed in claim 9 wherein the citric acid is added in the ratio of from about 10 to about 50 pounds per 1,000 gallons of the acidizing fluid and wherein the acetic acid is added in the ratio of at least 10 gallons per 1,000 gallons of the acidizing fluid, based on an 80% acetic acid solution.

12. In a well acidizing operation performed to treat a disposal or injection well containing iron and like substances, the steps of introducing into the well an acidizing fluid containing hydrochloric acid and a sequestering agent consisting essentially of a member from the group consisting of citric acid and the salts thereof and a member, other than citric acid and the salts thereof, selected from the group consisting of the low molecular weight organic acids and the salts thereof, the total amount and relative proportions of said members being sufficient to prevent precipitation of said iron and like substances from said fluid for a longer period of time than is obtainable with an equal amount of either member alone; causing said acidizing fluid to contact structures in the well to be treated, whereupon the treating acid is permitted to attack substances in the well; and thereafter displacing said acidizing fluid into the well strata.

13. In an acidizing operation performed to treat an oil or gas well or the like to increase or restore the permeability of a zone or formation therein through which fluid is to be conducted during the course of operating the well, the steps of introducing into the well an acidizing fluid containing hydrochloric acid and a sequestering agent for iron and like substances, the sequestering agent consisting essentially of a member from the group consisting of citric acid and the salts thereof and a member, other than citric acid and the salts thereof, selected from the group consisting of the low molecular weight organic acids and the salts thereof, said last-named member being soluble in said fluid, and the total amount and relative proportions of said members being sufficient to prevent precipitation of said iron and like substances from said fluid for a longer period of time than is obtainable with an equal amount of either member alone; causing said acidizing fluid to contact the zone or formation to be treated, whereupon the treating acid is permitted to attack substances and thereby increase or restore the permeability of said zone or formation; and thereafter removing said acidizing fluid from the treated zone or formation.

References Cited in the file of this patent
UNITED STATES PATENTS

| | | |
|---|---|---|
| 2,175,095 | Stoesser | Oct. 3, 1939 |
| 2,221,353 | Limerick et al. | Nov. 12, 1940 |
| 2,301,875 | Holmes | Nov. 10, 1942 |
| 2,640,810 | Cardwell et al. | June 2, 1953 |